US012324066B2

(12) United States Patent
Guo et al.

(10) Patent No.: US 12,324,066 B2
(45) Date of Patent: Jun. 3, 2025

(54) CONTROL METHOD FOR LAMP SYSTEM BASED ON RGB WIRING ARRANGEMENT

(71) Applicant: Guangzhou Rising Dragon Recreation Industrial Co., Ltd., Guangzhou (CN)

(72) Inventors: Ziqin Guo, Guangzhou (CN); Bo Liang, Guangzhou (CN)

(73) Assignee: Guangzhou Rising Dragon Recreation Industrial Co., Ltd., Guangzhou (CN)

( * ) Notice: Subject to any disclaimer, the term of this patent is extended or adjusted under 35 U.S.C. 154(b) by 168 days.

(21) Appl. No.: 18/466,857

(22) Filed: Sep. 14, 2023

(65) Prior Publication Data

US 2024/0130017 A1 Apr. 18, 2024

(30) Foreign Application Priority Data

Oct. 13, 2022 (CN) ........................ 202211252446.4

(51) Int. Cl.
*H05B 45/325* (2020.01)
*H05B 45/10* (2020.01)
*H05B 45/34* (2020.01)

(52) U.S. Cl.
CPC ........... *H05B 45/325* (2020.01); *H05B 45/10* (2020.01); *H05B 45/34* (2020.01)

(58) Field of Classification Search
CPC ...... H05B 45/325; H05B 45/10; H05B 45/34; H05B 47/18; H05B 45/20; H05B 47/165; H05B 47/10; H05B 47/155
USPC .......................................................... 315/294
See application file for complete search history.

(56) References Cited

U.S. PATENT DOCUMENTS

| | | | | |
|---|---|---|---|---|
| 7,515,128 B2 * | 4/2009 | Dowling | H05B 47/165 | 345/82 |
| 7,852,010 B2 * | 12/2010 | Negley | H05B 45/46 | 315/192 |
| 7,852,011 B2 * | 12/2010 | Peng | H05B 45/00 | 315/185 S |
| 8,115,410 B2 * | 2/2012 | Baaijens | H05B 45/20 | 315/307 |
| 9,370,073 B2 * | 6/2016 | Pi | H05B 45/22 | |
| 2007/0217209 A1 * | 9/2007 | Wong | H05B 45/20 | 362/418 |
| 2009/0289578 A1 * | 11/2009 | Peng | H05B 45/22 | 315/294 |
| 2011/0025214 A1 * | 2/2011 | Lin | H05B 47/18 | 315/185 R |

(Continued)

*Primary Examiner* — Ryan Jager
(74) *Attorney, Agent, or Firm* — Andrew C. Cheng

(57) ABSTRACT

A control method for a lamp system based on RGB wiring arrangement includes outputting a first PWM signal through a connecting line and a second PWM signal through another connecting line; wherein, the first PWM signal is used for controlling an on/off time interval of a first switch device on the connecting line to generate a continuous variable level at two terminals of the resistor on the connecting line, the continuous variable level forms a digital signal, and the second PWM signal is used for controlling the second switch device on the another connecting line to be normally-off to provide a stable power supply; the lamps acquiring corresponding control information from the digital signal through ID matching; and after the control information is decoded by the decoding module, currents transmitted to the coloured light emitting modules being regulated to control the coloured light emitting modules.

10 Claims, 4 Drawing Sheets

(56) References Cited

U.S. PATENT DOCUMENTS

| | | | | |
|---|---|---|---|---|
| 2013/0270998 | A1* | 10/2013 | Pi | H05B 45/22 |
| | | | | 315/51 |
| 2024/0130017 | A1* | 4/2024 | Guo | H05B 45/20 |

* cited by examiner

CONTROL METHOD FOR LAMP SYSTEM BASED ON RGB WIRING ARRANGEMENT

FIELD

The invention relates to the technical field of lighting, and particularly relates to a control method for a lamp system based on RGB wiring arrangement. The control method is particularly suitable for traditional RGB four-wire PWM lamp systems merely by upgrading original software or firmware.

BACKGROUND

In the field of lamp control, traditional RGB four-wire lamp systems are widely used. A four-wire RGB lighting control system with a driving ability can use a common negative or positive wire to thereby omit one connecting line. The colour lines of lamps in the system are directly and correspondingly connected to an output signal line of a controller to realize colour control of lamps. Lighting control signals for controlling corresponding colours in such traditional RGB four-wire PWM lamp systems are generated often by software and hardware. However, due to the fact that the output signal line of the controller is directly connected with the colour lines of the corresponding lamps to realize colour control of the lamps, multiple lamps connected to the system receive the same control information at the same time to change their colours synchronously, and the lamps in the system cannot be controlled separately. In addition, after being processed by the controller, signals transmitted on RGB lines are PWM signals, which are modulated variable colour information, so there is no fixed voltage output, which makes it difficult to realize system expansion.

With the improvement of living standards, people put forward new requirements for the control effect of lamps, and it is impractical to abandon or directly change the traditional RGB four-wire wiring structure of the widely used traditional RGB four-wire PWM lamp systems on the market to improve the control effect of lamps. So, there is an urgent demand for a method for realizing effects of constant power supply, coded signal transmission of lamps and separate control of the lamps merely by changing software and lamps, without changing the signal hardware and original line structure of traditional RGB four-wire PWM lamp systems.

SUMMARY

In view of the abovementioned problems in the prior art, the invention provides a control method for a lamp system based on RGB wiring arrangement. According to the control method for the lamp system based on RGB wiring arrangement, lamps with addresses are connected to an original line, such that separate control of the lamps can be realized merely by changing software and implementing constant power supply and coded signal transmission of lamps, without changing the signal hardware and original line structure of traditional RGB four-wire PWM lamp systems.

In one aspect, the prevent invention provides a control method for a lamp system based on RGB wiring arrangement, wherein the lamp system comprises a lighting control module and a plurality of lamps, each of the lamps has a specific ID and comprises a decoding module and at least one coloured light emitting module; a connecting line A, a connecting line B and a positive power connecting line are disposed between the lamps and the lighting control module, a first switch device is disposed on the connecting line A, a second switch device is disposed on the connecting line B, a first load resistor is disposed between the connecting line A and the positive power connecting line, a second load resistor is disposed between the connecting line B and the positive power connecting line, and the connecting line B is grounded. The control method comprises:

the lighting control module outputting a first PWM signal through the connecting line A and outputting a second PWM signal through the connecting line B; wherein, the first PWM signal is used for controlling an on/off time interval of the first switch device on the connecting line A to generate a continuous variable level at two terminals of the first load resistor on the connecting line A, the continuous variable level forms a digital signal, and the second PWM signal is used for controlling the second switch device on the connecting line B to be normally-off to thereby provide a stable power supply;

the lamps acquiring corresponding control information from the digital signal through ID matching; and after the control information is decoded by the respective decoding modules, currents transmitted to the coloured light emitting modules being regulated to control the coloured light emitting modules.

In some embodiments, the digital signal comprises an initial mark signal, at least one ID, and coded brightness information matching the at least one ID.

In some embodiments, after the second switch device on the connecting line B is turned on, the decoding modules start to read and obtain the preset initial mark signal and the IDs of the lamps in a stable voltage environment.

In some embodiments, the lamps acquiring corresponding control information from the digital signal comprises:

the decoding modules receiving the digital signal through the connecting line A and scanning the digital signal to search for the initial mark signal;

the decoding modules scanning the initial mark signal to search for the respective IDs; and the decoding modules reading coded brightness information of the respective lamps from the digital signal.

In some embodiments, the coded brightness information comprises brightness information for controlling red light, brightness information for controlling green light, and brightness information for controlling blue light, and the decoding modules decode the coded brightness information and perform data logic calculation to form R, G and B light adjusting PWM waves and output the R, G and B light adjusting PWM waves to the coloured light emitting modules.

In some embodiments, the decoding modules regulate input currents corresponding to the red light, the green light and the blue light in the coloured light emitting modules by means of the R, G and B light adjusting PWM waves respectively, to control corresponding brightness of the red light, the green light and the blue light output by the coloured light emitting modules, and specific changes of the coloured light emitting modules are finally controlled by controlling the red light, the green light and the blue light.

In some embodiments, the lamp system further comprises a main controller which is in communication connection with the lighting control module and used for sending a mode control signal to the lighting control module; and wherein when receiving the mode control signal, the lighting control module converts and processes the mode control signal to generate the first PWM signal and the second PWM signal.

In some embodiments, the second PWM signal is set as a stable level without change in the control process.

In some embodiments, a connecting line C is disposed between the lamps and the lighting control module, a third switch device is disposed on the connecting line C, a third load resistor is disposed between the connecting line C and the positive power connecting line, and the control method further comprises:

outputting a third PWM signal which is identical with the first PWM signal in phase and opposite to the first PWM signal in level, and the variable level at two terminals of the first load resistor on the connecting line A and another variable level at two terminals of the third load resistor on the connecting line C forming a differential digital signal which is received by the lamps to thereby control the lamps to change.

In some embodiments, a connecting line C is disposed between the lamps and the lighting control module, a third switch device is disposed on the connecting line C, a third load resistor is disposed between the connecting line C and the positive power connecting line, and the control method further comprises:

outputting another PWM signal used for controlling an on/off time interval of the third switch device on the connecting line C, and another continuous variable level being generated at two terminals of the third load resistor on the connecting line C, said another continuous variable level forming another digital signal.

Compared with the prior art, the invention has the following beneficial effects: according to the control method described above, by upgrading a software program in the lighting control module, a mode control signal input to the lighting control module is divided/specifically analyzed into a first PWM signal for controlling lamps to change and a second PWM signal for controlling power supply of the lamps, such that on-off and changes of the lamps are controlled separately; the second PWM signal keeps in a stable level state in the whole control process, such that constant power supply of the entire system is realized; the first PWM signal can change the current across the two terminals of the load resistor on the corresponding connecting line by controlling the on/off time interval of the switch device on the corresponding connecting line, to generate a digital signal, and the lamps obtain corresponding control information through ID matching, and after the decoding modules decode the control information, output currents are regulated to control the coloured light emitting modules. The constant power supply of the system guarantees the expansibility of the system, separate control of the lamps can be realized only by connecting new lamps with specific IDs to an original line, any one or more lamps in the system can be controlled and changed, and the lighting effect of currently sold lamp systems based on RGB wiring arrangement can be upgraded.

On the premise of not changing the signal hardware and original line structure of traditional RGB four-wire PWM lamp systems, the systems can transmit at least 76.8 k signals according to the grey-scale 300 HZ 256 of lighting control signals transmitted by the original systems; after the transformation, a signal transmission circuit is connected to load resistors rather than being directly connected to RGB lamps, so the load power is much lower than the lighting power of original lamps, signals greater than 76.8 k can be transmitted, and the transmission efficiency of the system is improved.

DESCRIPTION OF THE EMBODIMENTS

The invention will be described in further detail below in conjunction with the accompanying drawings. It should be particularly pointed that the embodiments in the following description are merely illustrative ones, and are not all possible ones of the invention. All other embodiments obtained by those ordinarily skilled in the art based on the following ones without creative labor should also fall within the protection scope of the invention.

Figure 2:
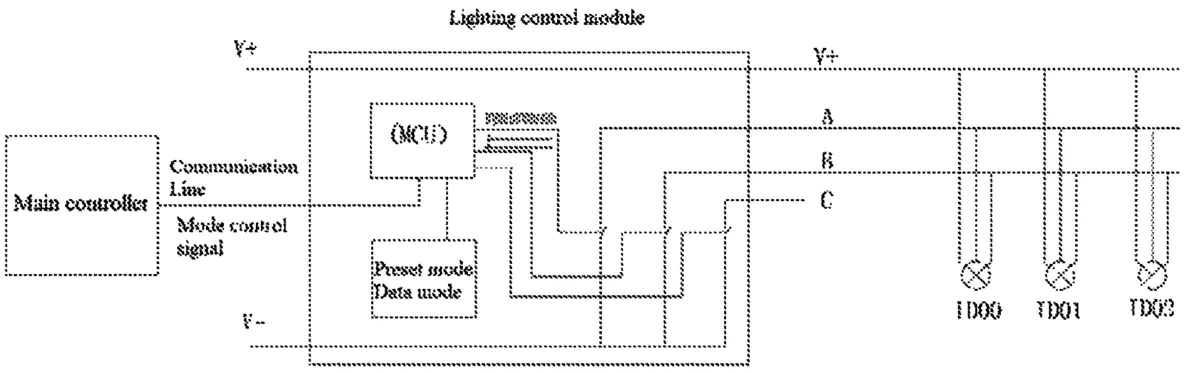
FIG. 2 is a connection diagram of a system according to the invention.
Figure 3:
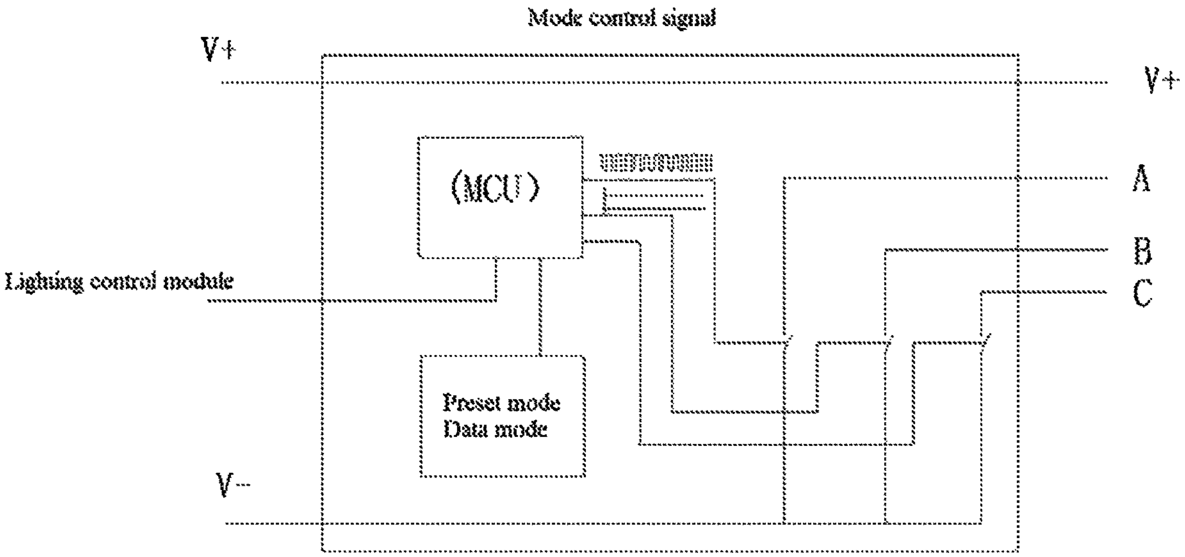
FIG. 3 is a structural diagram of a lighting control module according to the invention.
Figure 4:
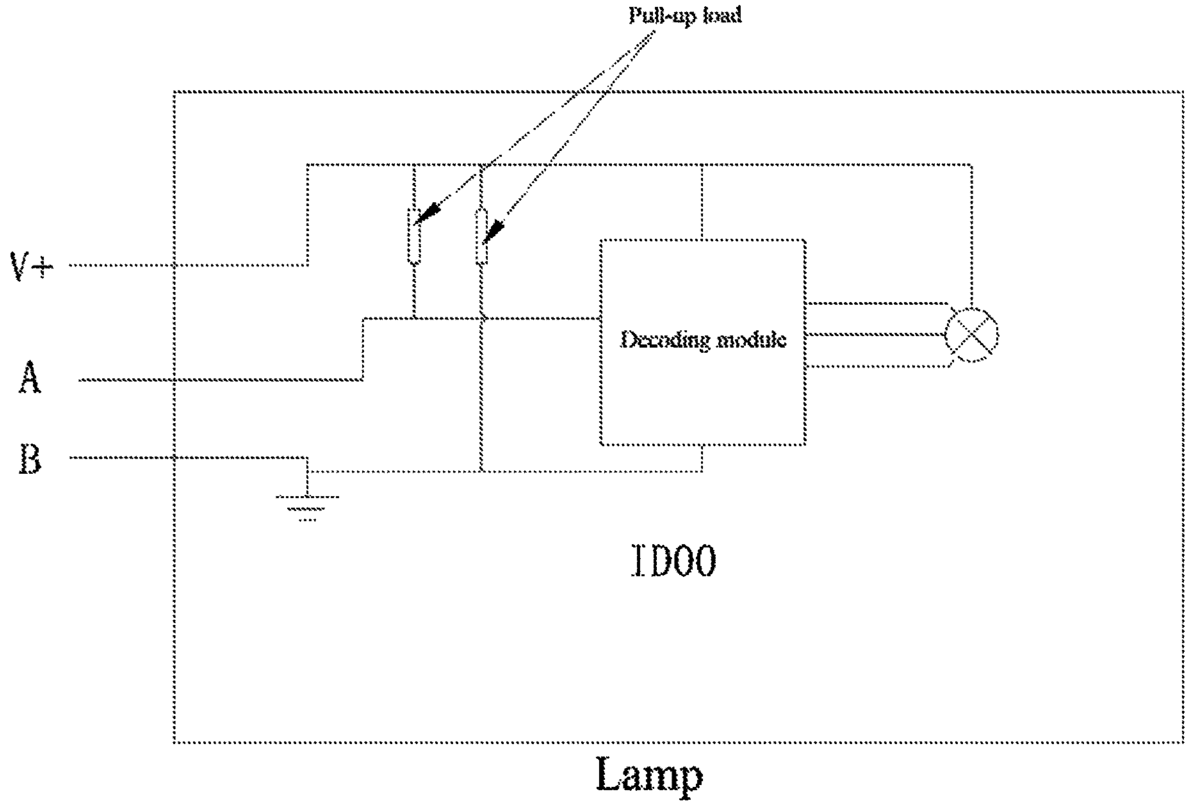
FIG. 4 is a structural diagram of a lamp according to the invention.

Referring to FIG. 2, FIG. 3 and FIG. 4, this embodiment provides a lamp system based on RGB wiring arrangement, which is controlled through a method provided by the invention. The lamp system based on RGB wiring arrangement comprises a main controller, a lighting control module and a plurality of lamps, wherein each of the lamps has a specific identity document (ID), and comprises a decoding module and a coloured light-emitting module.

The lighting control module is in communication connection with the main controller, and the lighting control module is connected to the main controller through a communication line or wirelessly.

A connecting line A, a connecting line B and a positive power connecting line V+ are disposed between the lamps and the lighting control module, and the lighting control module may be connected in parallel with the multiple lamps. A first switch device is disposed on the connecting line A, a second switch device is disposed on the connecting line B, a first load resistor is disposed between the connecting line A and the positive power connecting line, a second load resistor is disposed between the connecting line B and the positive power connecting line, and the connecting line B is grounded. In this embodiment, the lamp system adopts a common positive line, so pull-up load resistors are disposed in the lamps; if the lamp system adopts a common negative line, pull-down load resistors will be disposed in the lamps.

Figure 1:
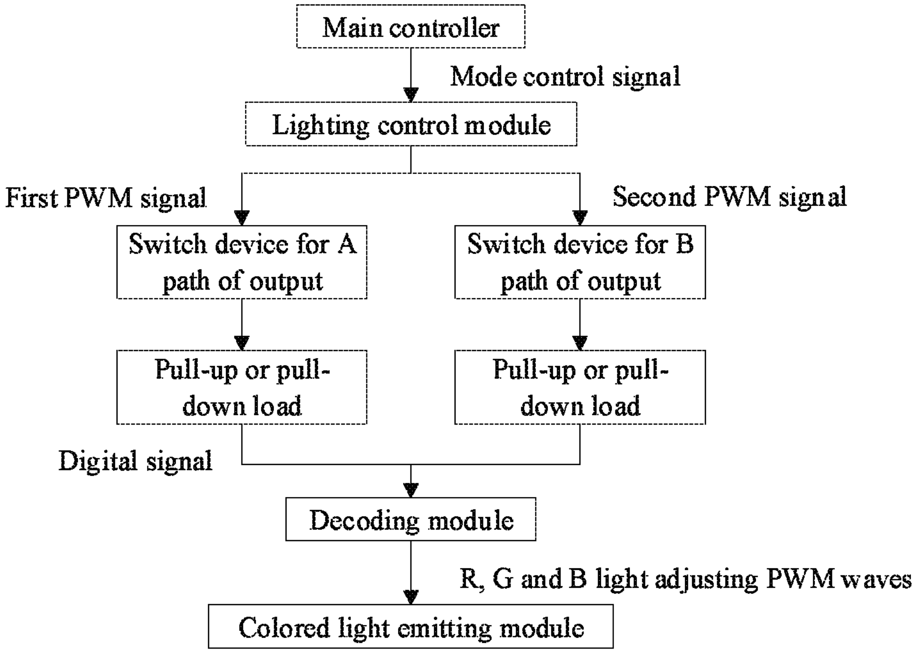
FIG. 1 is a flow diagram of a method according to the invention.

Referring to FIG. 1, a control method for the lamp system based on RGB wiring arrangement specifically comprises the following steps:

The main controller sends a mode control signal to the lighting control module; the lighting control module receives the mode control signal, and then converts and processes the mode control signal to generate a first PWM signal and a second PWM signal.

The lighting control module outputs the second PWM signal through the connecting line B, wherein the second PWM signal is used for controlling the second switch devices on the connecting line B to be normally-off, and the second PWM signal is always a stable level and will not change in the whole process, thereby providing a stable power supply environment of the entire system.

The lighting control module outputs the first PWM signal through the connecting line A, wherein the first PWM signal is used for controlling the on/off time interval of the first switch device on the connecting line A, a continuous variable level is generated at two terminals of the first load resistor on the connecting line A, and the continuous variable level forms a first digital signal. Wherein, the first digital signal comprises an initial mark signal, at least one ID, and coded brightness information matching the at least one ID; the initial mark signal and the ID are preset specific digital signal, and lamps with different IDs can be numbered specifically with, such as, ID00, ID01 and ID02; and multiple lamps with the same number may be connected to the same lamp system, such that one or more lamps in the system can be controlled.

In this embodiment, after the second switch device on the connecting line B is turned on, the decoding modules of the lamps start to read and obtain the preset initial mark signal and the IDs of the lamps.

At the same time, the decoding modules receive the first digital signal through the connecting line A and scan the first digital signal to search for the initial mark signal; the decoding modules scan the initial mark signal when receiving it, and start to read the coded brightness information of the respective lamps from the first digital signal when capturing the IDs of the lamps.

The coded brightness information comprises brightness information for controlling red light, brightness information for controlling green light, and brightness information for controlling blue light, the decoding modules decode the coded brightness information and performs data logic calculation to form R, G and B light adjusting PWM waves and output the R, G and B light adjusting PWM waves to the coloured light emitting modules.

The decoding modules regulate input currents corresponding to red light, green light and blue light in the coloured light emitting modules by means of the R, G and B light adjusting PWM waves respectively, to control corresponding brightness of the red light, the green light and the blue light output by the coloured light emitting modules, and specific changes of the coloured light emitting modules are finally controlled by controlling the red light, the green light and the blue light.

A connecting line C is disclosed between the lamps and the lighting control module, a switch device is disposed on the connecting line C, and a load resistor is disposed between the connecting line C and the positive power connecting line; in order to guarantee the accuracy of signals of the system during long-distance transmission, the connecting line C outputs a third PWM signal, which is identical with the first PWM signal in phase and opposite to the first PWM signal in level, and a variable level at two terminals of the load resistor on the connecting line A and a variable level at two terminals of the load resistor on the connecting line C form a differential digital signal, which is received by the lamps to control the lamps to change.

In a case where the amount of information to be transmitted by the system is large, the connecting line C outputs a fourth PWM signal used for controlling the on/off time interval of the third switch device on the connecting line C, a variable level is generated at two terminals of the load resistor on the connecting line C, the continuous variable forms a second digital signal, and the second digital signal and the first digital signal synchronously output control information matching different IDs to the system to improve the information transmission capacity of the system.

According to the control method for a lamp system based on RGB wiring arrangement provided by the invention, by upgrading software in the lighting control module, a first PWM signal and a second PWM signal are output to control on/off and changes of lamps respectively; the stable second PWM signal can realize constant power supply of the system, and the first PWM signal can be modulated to control on/off of the switch device on the corresponding connecting line to change the current across the two terminals of the load resistor on the corresponding connecting line, to generate a digital signal, and according to decoded control information matching the IDs of the lamps, output currents can be regulated to control the lamps; the constant power supply of the system guarantees the expansibility of the system, separate control of the lamps can be realized only by replacing original lamps with lamps with IDs, any one or more lamps can be controlled and changed, and the lighting effect of other sold lamp systems based on RGB wiring arrangement can be upgraded; and after the transformation, a signal transmission circuit is connected to load resistors rather than being directly connected to RGB lamps, so the load power is much lower than the lighting power of the original lamps, and the transmission efficiency of the system is improved.

The embodiments disclosed above are merely used for a detailed description of the invention, and should not be construed as limitations of the scope of the invention. All simple improvements and modifications made within the scope of the claims of the invention should fall within the protection scope of the invention.

The protection scope of the invention should be defined by the claims. Those ordinarily skilled in the art can make some improvements and embellishments without departing from the spirit and scope of the invention, and these improvements and embellishments should also fall within the protection scope of the invention.

What is claimed is:

1. A control method for a lamp system based on RGB wiring arrangement, wherein the lamp system comprises a lighting control module and a plurality of lamps, each of the lamps has a specific ID and comprises a decoding module and at least one coloured light emitting module; a connecting line A, a connecting line B and a positive power connecting line are disposed between the lamps and the lighting control module, a first switch device is disposed on the connecting line A, a second switch device is disposed on the connecting line B, a first load resistor is disposed between the connecting line A and the positive power connecting line, a second load resistor is disposed between the connecting line B and the positive power connecting line, and the connecting line B is grounded, the control method comprising:

the lighting control module outputting a first PWM signal through the connecting line A and outputting a second PWM signal through the connecting line B; wherein, the first PWM signal is used for controlling an on/off time interval of the first switch device on the connecting line A to generate a continuous variable level at two terminals of the first load resistor on the connecting line A, the continuous variable level forms a digital signal, and the second PWM signal is used for controlling the second switch device on the connecting line B to be normally-off to thereby provide a stable power supply;

the lamps acquiring corresponding control information from the digital signal through ID matching; and after the control information is decoded by the respective decoding modules, currents transmitted to the coloured light emitting modules being regulated to control the coloured light emitting modules.

2. The control method for a lamp system based on RGB wiring arrangement according to claim 1, wherein the digital signal comprises an initial mark signal, at least one ID, and coded brightness information matching the at least one ID.

3. The control method for a lamp system based on RGB wiring arrangement according to claim 2, wherein after the second switch device on the connecting line B is turned on, the decoding modules start to read and obtain the preset initial mark signal and the IDs of the lamps in a stable voltage environment.

4. The control method for a lamp system based on RGB wiring arrangement according to claim 3, wherein the lamps acquiring corresponding control information from the digital signal comprises:

the decoding modules receiving the digital signal through the connecting line A and scanning the digital signal to search for the initial mark signal;

the decoding modules scanning the initial mark signal to search for the respective IDs; and the decoding modules reading coded brightness information of the respective lamps from the digital signal.

5. The control method for a lamp system based on RGB wiring arrangement according to claim 4, wherein the coded brightness information comprises brightness information for controlling red light, brightness information for controlling green light, and brightness information for controlling blue light, and the decoding modules decode the coded brightness information and perform data logic calculation to form R, G and B light adjusting PWM waves and output the R, G and B light adjusting PWM waves to the coloured light emitting modules.

6. The control method for a lamp system based on RGB wiring arrangement according to claim 5, wherein the decoding modules regulate input currents corresponding to the red light, the green light and the blue light in the coloured light emitting modules by means of the R, G and B light adjusting PWM waves respectively, to control corresponding brightness of the red light, the green light and the blue light output by the coloured light emitting modules, and specific changes of the coloured light emitting modules are finally controlled by controlling the red light, the green light and the blue light.

7. The control method for a lamp system based on RGB wiring arrangement according to claim 6, wherein the lamp system further comprises a main controller which is in communication connection with the lighting control module and used for sending a mode control signal to the lighting control module; and wherein when receiving the mode control signal, the lighting control module converts and processes the mode control signal to generate the first PWM signal and the second PWM signal.

8. The control method for a lamp system based on RGB wiring arrangement according to claim 1, wherein the second PWM signal is set as a stable level without change in the control process.

9. The control method for a lamp system based on RGB wiring arrangement according to claim 1, wherein a connecting line C is disposed between the lamps and the lighting control module, a third switch device is disposed on the connecting line C, a third load resistor is disposed between the connecting line C and the positive power connecting line, and the control method further comprises:

outputting a third PWM signal which is identical with the first PWM signal in phase and opposite to the first PWM signal in level, and the variable level at two terminals of the first load resistor on the connecting line A and another variable level at two terminals of the third load resistor on the connecting line C forming a differential digital signal which is received by the lamps to thereby control the lamps to change.

10. The control method for a lamp system based on RGB wiring arrangement according to claim 1, wherein a connecting line C is disposed between the lamps and the lighting control module, a third switch device is disposed on the connecting line C, a third load resistor is disposed between the connecting line C and the positive power connecting line, and the control method further comprises:

outputting another PWM signal configured for controlling an on/off time interval of the third switch device on the connecting line C; and another continuous variable level being generated at two terminals of the third load resistor on the connecting line C, said another continuous variable level forming another digital signal.

* * * * *